US012801189B2

(12) United States Patent
Liu et al.

(10) Patent No.: US 12,801,189 B2
(45) Date of Patent: Nov. 17, 2026

(54) HINGE APPARATUS FOR A DUAL-BODY INFORMATION HANDLING SYSTEM

(71) Applicant: Dell Products L.P., Round Rock, TX (US)

(72) Inventors: Tsan-Wei Liu, New Taipei City (TW); Houchun Wang, New Taipei City (TW); Yaotsung Chang, Taipei City (TW)

(73) Assignee: Dell Products L.P., Round Rock, TX (US)

(*) Notice: Subject to any disclaimer, the term of this patent is extended or adjusted under 35 U.S.C. 154(b) by 106 days.

(21) Appl. No.: 18/935,888

(22) Filed: Nov. 4, 2024

(65) Prior Publication Data

US 2026/0126831 A1 May 7, 2026

(51) Int. Cl.
*G06F 1/16* (2006.01)
*F16C 11/04* (2006.01)

(52) U.S. Cl.
CPC ............ *G06F 1/1681* (2013.01); *F16C 11/04* (2013.01)

(58) Field of Classification Search
CPC ...... G06F 1/1681; G06F 1/1616; F16C 11/04; E05D 11/00; E05D 3/122; F16H 37/126
See application file for complete search history.

(56) References Cited

U.S. PATENT DOCUMENTS

2014/0133095 A1* 5/2014 Wu ........................ G06F 1/1616 361/692
2019/0243426 A1* 8/2019 Morrison .............. G06F 1/1681
2019/0317552 A1* 10/2019 Cheng ...................... G06F 1/166
2023/0084065 A1* 3/2023 Park ........................ G06F 1/166 16/341

* cited by examiner

*Primary Examiner* — Allen L Parker
*Assistant Examiner* — Peter Krim
(74) *Attorney, Agent, or Firm* — McDermott Will & Schulte LLP

(57) ABSTRACT

A hinge apparatus for a dual-body IHS, including a bracket coupled to a first body of the dual-body IHS; a gear assembly including a first gear, the gear assembly coupled to the bracket via a shaft; a rack moveably coupled to the gear assembly, the rack including an angled surface; a foot assembly coupled to a second body of the dual-body IHS, including: a base; a protrusion extending from the base, the protrusion including a sloped surface; wherein the first body is rotatable with respect to the second body to rotate the first gear via the bracket, wherein the first gear is rotatable to translate the rack along a first direction, wherein the rack is translatable along the first direction such that the angled surface of the rack contacts the sloped surface of the protrusion to translate the foot assembly in a second direction position orthogonal to the first direction.

16 Claims, 11 Drawing Sheets

HINGE APPARATUS FOR A DUAL-BODY INFORMATION HANDLING SYSTEM

BACKGROUND

Field of the Disclosure

The disclosure relates generally to an information handling system, and in particular, a hinge apparatus for a dual-body information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Elevating the bottom of a laptop is a simple yet effective method to enhance thermal cooling. This technique works by improving airflow around the laptop's chassis, allowing heat to dissipate more efficiently. When a laptop rests flat on a surface, its built-in cooling system, which often relies on vents at the bottom, can become obstructed, leading to poor heat management. By using a stand or riser to elevate the laptop, the air can circulate freely underneath, helping to maintain a cooler operating temperature. This not only protects the internal components from overheating but also contributes to better performance and longevity of the device.

SUMMARY

Innovative aspects of the subject matter described in this specification may be embodied in a hinge apparatus for a dual-body information handling system, including: a bracket coupled to a first body of the dual-body information handling system; a gear assembly including at least a first gear, the gear assembly coupled to the bracket via a shaft; a rack moveably coupled to the gear assembly, the rack including an angled surface; a foot assembly coupled to a second body of the dual-body information handling system, including: a base; and a protrusion extending from the base, the protrusion including a sloped surface; wherein the first body is rotatable with respect to the second body to rotate the first gear via the bracket, wherein the first gear is rotatable to translate the rack along a first direction, and wherein the rack is translatable along the first direction such that the angled surface of the rack contacts the sloped surface of the protrusion of the foot assembly to translate the foot assembly in a second direction from an initial position to a second position, the second direction orthogonal to the first direction.

Other embodiments of these aspects include corresponding systems and apparatus.

These and other embodiments may each optionally include one or more of the following features. For instance, the rack includes: a first side, including a toothed surface that is engaged with the gearing assembly; a second side positioned opposite to the first side, the second side including: a first surface spaced-apart from the toothed surface a first distance, a second surface spaced-apart from the toothed surface a second distance greater than the first distance, and the angled surface positioned between the first surface and the second surface. The protrusion of the foot assembly further includes a flat surface, and wherein when the rack is in the initial position, the first surface of the rack is in contact with the flat surface of the foot assembly. The angled surface of the rack is complimentary to the sloped surface of the protrusion of the foot assembly. The rack is translatable along the first direction such that the second surface of the rack contacts the flat surface of the foot assembly to transition the rack from the second position to a final position. The foot assembly further including: a plurality of flexible arms each coupled to the second body of the dual-body information handling system, wherein the flexible arms maintain the initial position of the foot assembly when the first surface of the rack is in contact with the flat surface of the protrusion of the foot assembly. The flexible arms flex to transition the foot assembly from the initial position to the second position when the angled surface of the rack contacts the sloped surface of the protrusion of the foot assembly. The flexible arms further flex to transition the foot assembly from the second position to the final position when the second surface of the rack contacts the flat surface of the protrusion of the foot assembly. The gear assembly includes the first gear, a second gear, and a third gear, wherein the first gear is rotatably coupled to the second gear and the second gear is rotatably coupled to the third gear, and wherein the third gear is rotatably coupled to the rack. Further including a holding bracket including a slot, wherein at least a portion of the rack is positioned within the slot of the holding bracket such that the rack is slidably coupled to the holding bracket. The gear assembly is coupled to the holding bracket.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
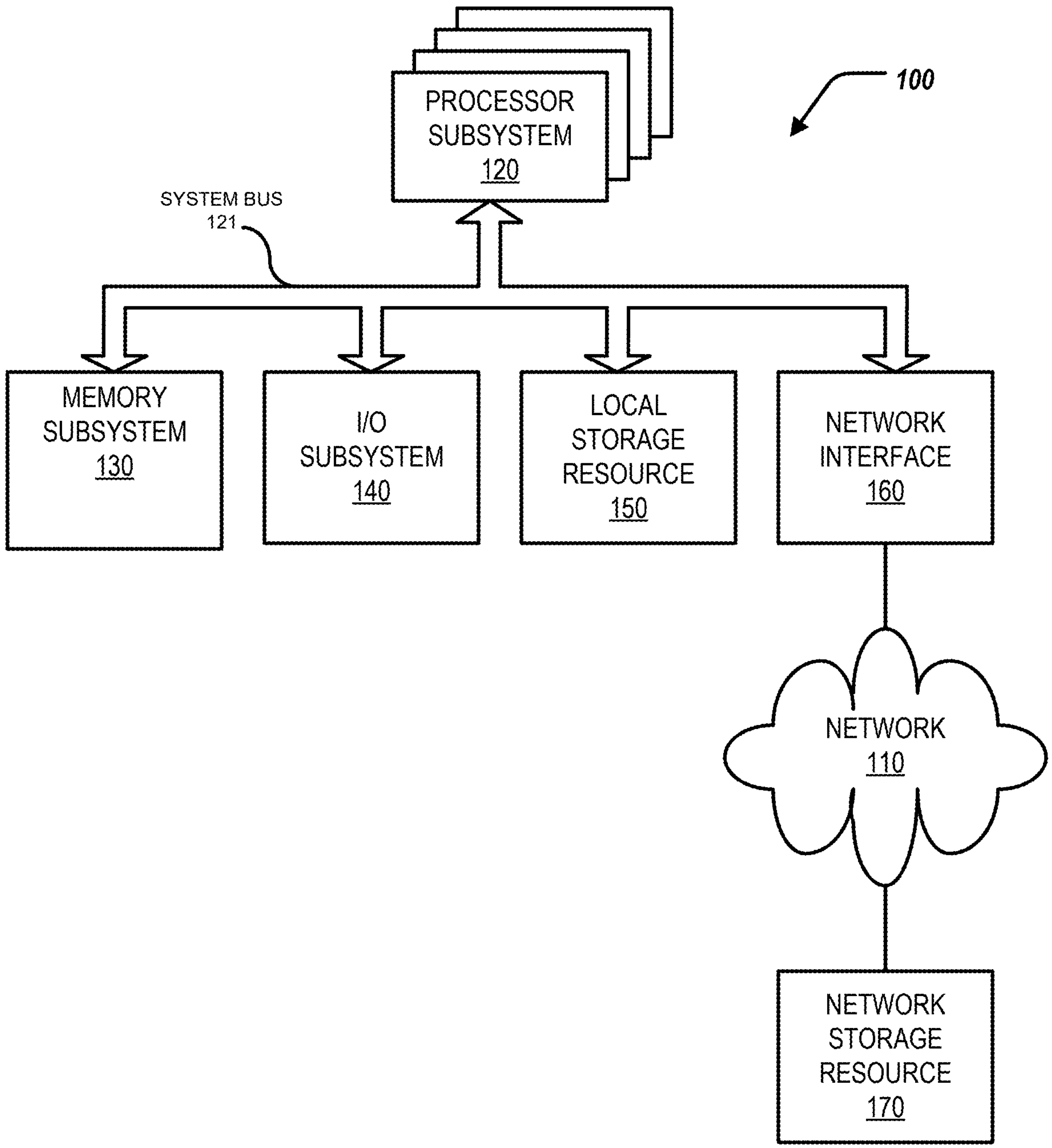
FIG. 1 is a block diagram of selected elements of an embodiment of an information handling system.

This disclosure discusses a hinge apparatus of an information handling system. In short, the hinge apparatus can facilitate "raising" the information handling system from an initial position to a second position (e.g., when set on a tabletop) when a second body of the information handling system is rotated with respect to the first body of the information handling system. This "self-elevating" hinge apparatus can automatically extend feet of the information handling system to improve system efficiency by maintaining an optimal operating temperature.

Specifically, this disclosure discusses a hinge apparatus for a dual-body information handling system, including: a bracket coupled to a first body of the dual-body information handling system; a gear assembly including at least a first gear, the gear assembly coupled to the bracket; a rack moveably coupled to the gear assembly, the rack including an angled surface; a foot assembly coupled to a second body of the dual-body information handling system, including: a base; and a protrusion extending from the base, the protrusion including a sloped surface; wherein the first body is rotatable with respect to the second body to rotate the first gear via the bracket, wherein the first gear is rotatable to translate the rack along a first direction, wherein the rack is translatable along the first direction such that the angled surface of the rack contacts the sloped surface of the protrusion of the foot assembly to translate the foot assembly in a second direction from an initial position to a second position, the second direction orthogonal to the first direction.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
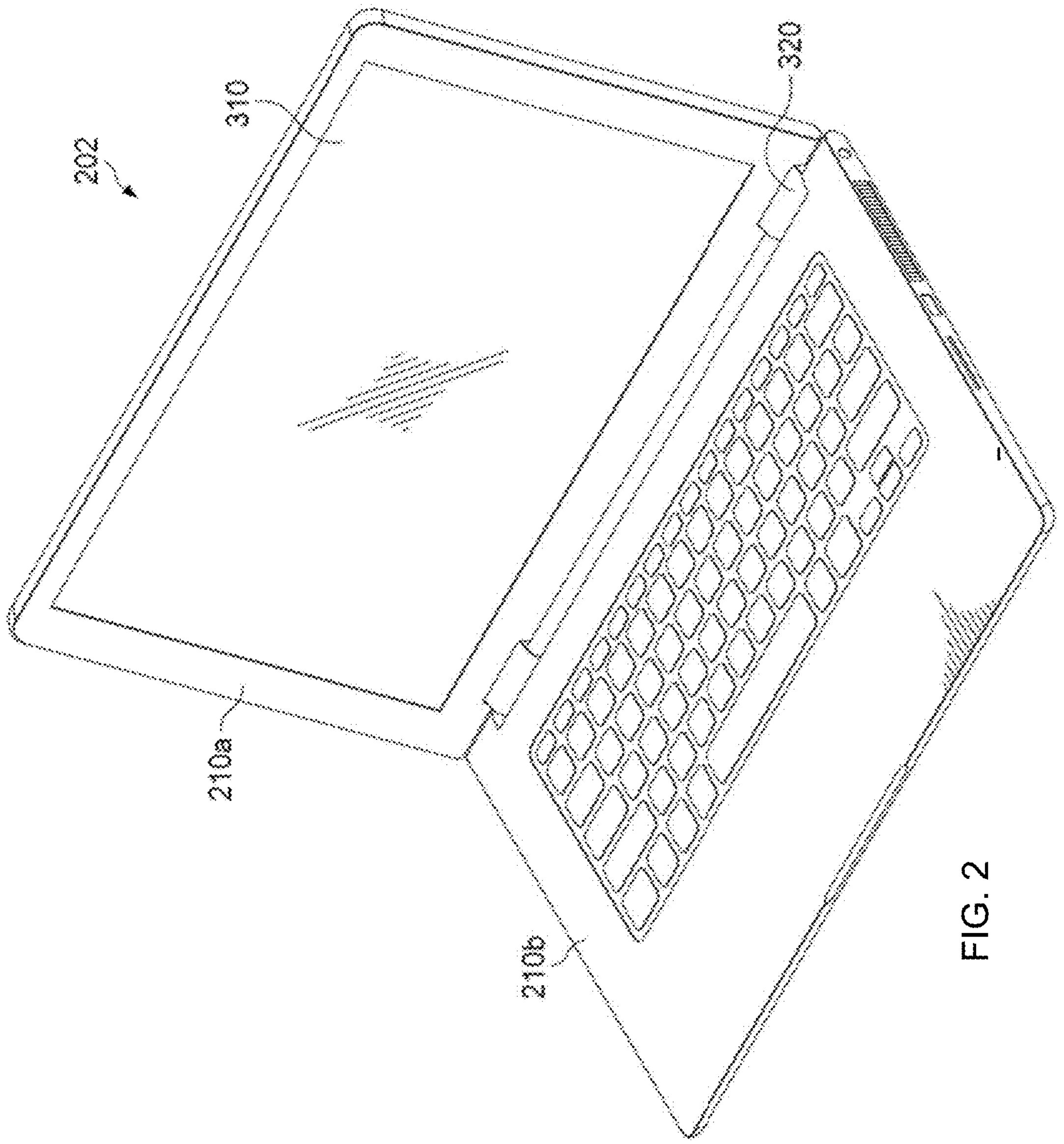
FIG. 2 illustrates a perspective view of the information handling system.

Turning to FIG. 2, FIG. 2 illustrates a perspective view of the information handling system 202, in an open state. The information handling system 202 can include a first body 210*a* and a second body 210*b* (collectively referred to as bodies 210). The first body 210*a* can include a display 310. A hinge apparatus 320 can couple the first body 210*a* to the second body 210*b*. In some examples, the information handling system 202 is similar to, or includes, the information handling system 100 of FIG. 1.

In short, the hinge apparatus 320 can facilitate "raising" the information handling system 202 from an initial position to a second position (e.g., when set on a tabletop) when the second body 210*b* is rotated with respect to the first body 210*a*. This "self-elevating" hinge apparatus can automatically extend feet of the information handling system 202 to improve system efficiency by maintaining an optimal operating temperature.

Figure 3:
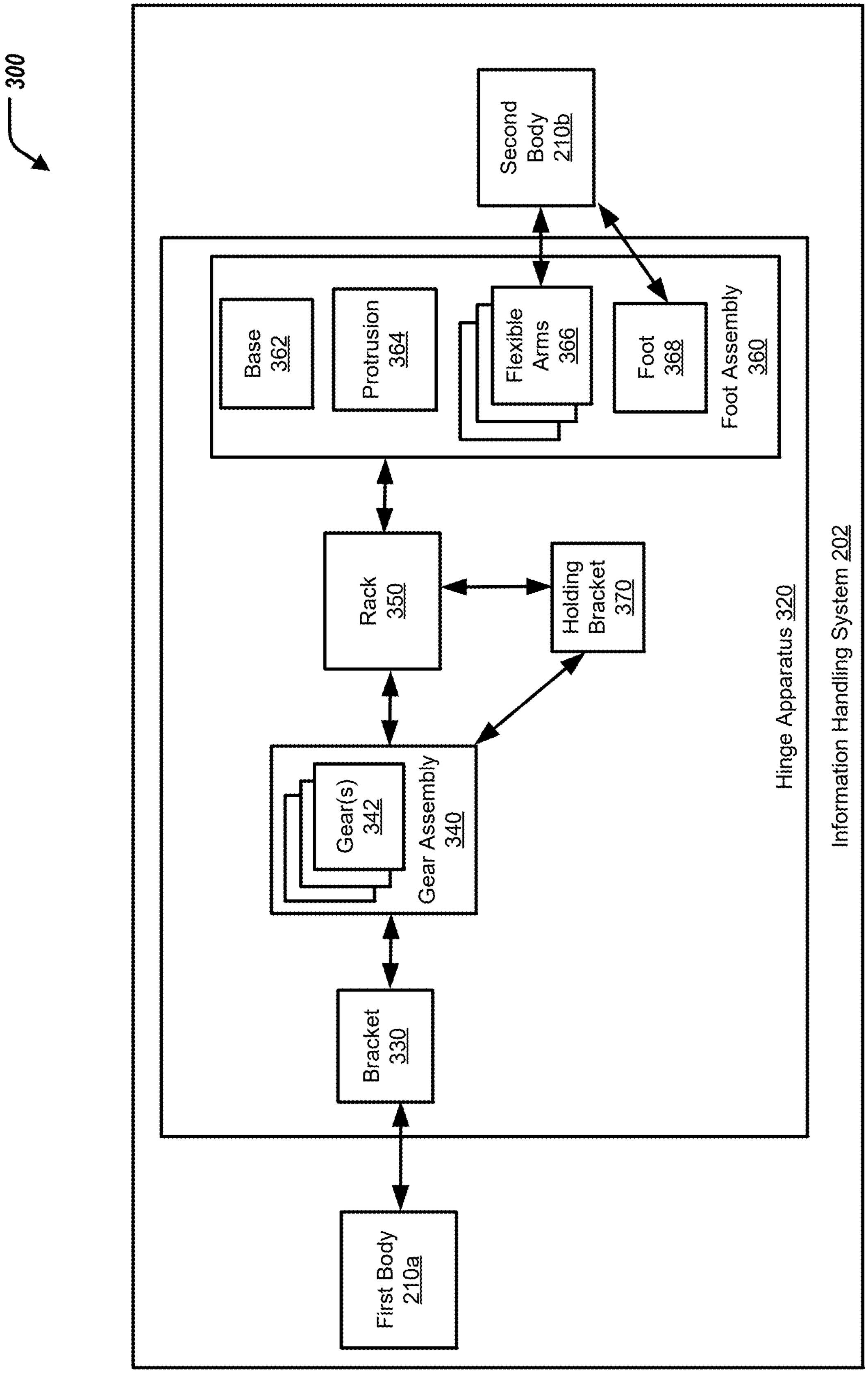
FIG. 3 illustrates a block diagram of the information handling system, including a hinge apparatus.

Turning to FIG. 3, FIG. 3 illustrates an environment 300 including the information handling system 202. The information handling system 202 can include the first body 210*a*, the second body 210*b*, and the hinge apparatus 320. In some examples, the information handling system 202 is similar to, or includes, the information handling system 100 of FIG. 1.

The hinge apparatus 320 can include a bracket 330, a gear assembly 340, a rack 350, a foot assembly 360, and a holding bracket 370. The gear assembly 340 can include one or more gears 342. The foot assembly 360 can include a base 362, a protrusion 364, one or more flexible arms 366, and a foot 368.

The hinge apparatus 320 is coupled to the first body 210*a* and the second body 210*b*. In other words, the hinge apparatus 320 couples the first body 210*a* to the second body 210*b*. In particular, the bracket 330 is coupled to the first body 210*a* and the foot assembly 360 is coupled to the second body 210*b*. Further, the gear assembly 340 is coupled to the bracket 330; the rack 350 is moveably coupled to the gear assembly 340; and the foot assembly 360 is moveably coupled to the rack 350, all described further herein. The gear assembly 340 and the rack 350 are coupled to the holding bracket 370.

Figure 4A:
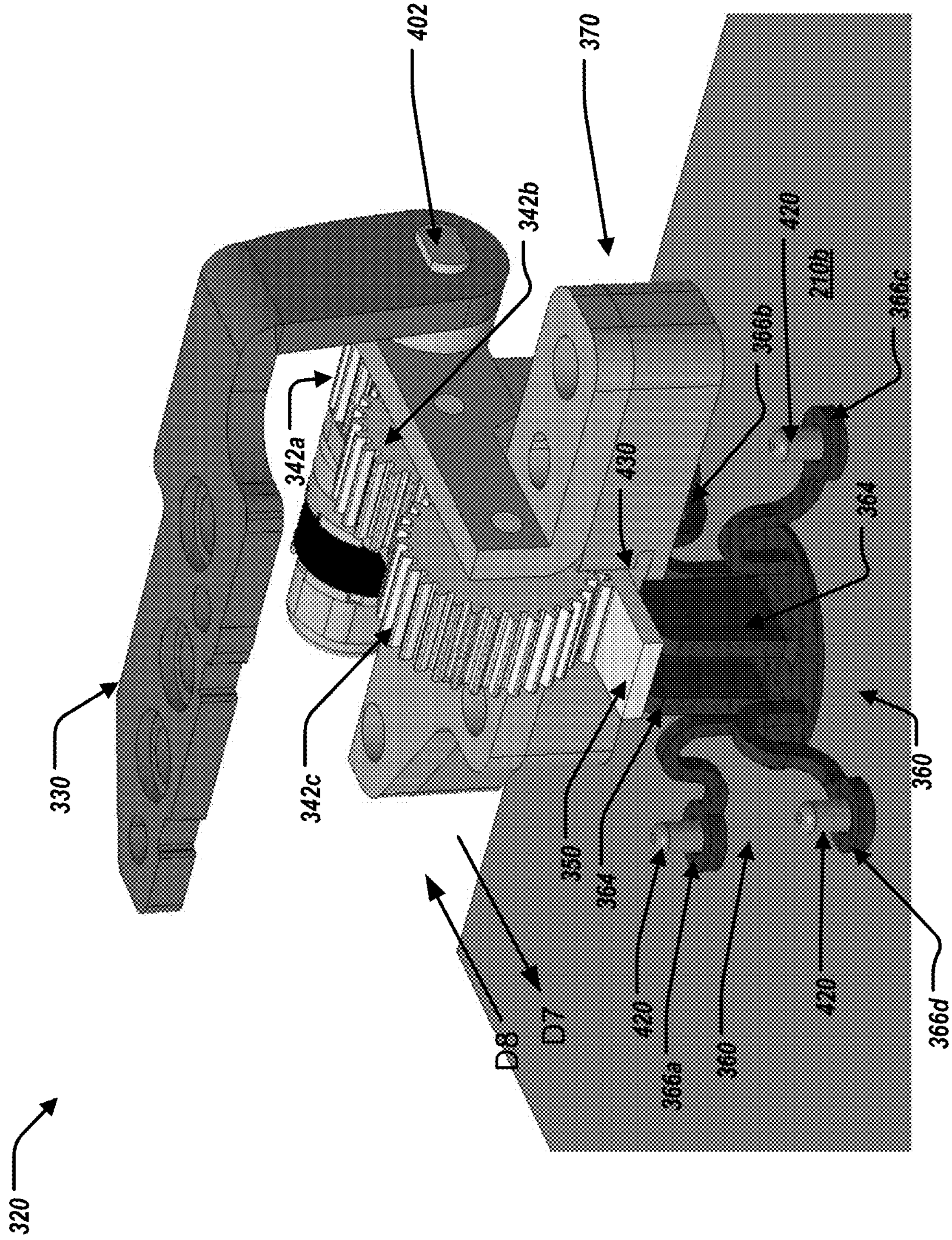
FIG. 4A illustrates a perspective view of the hinge apparatus, in a first positioning.
Figure 4B:
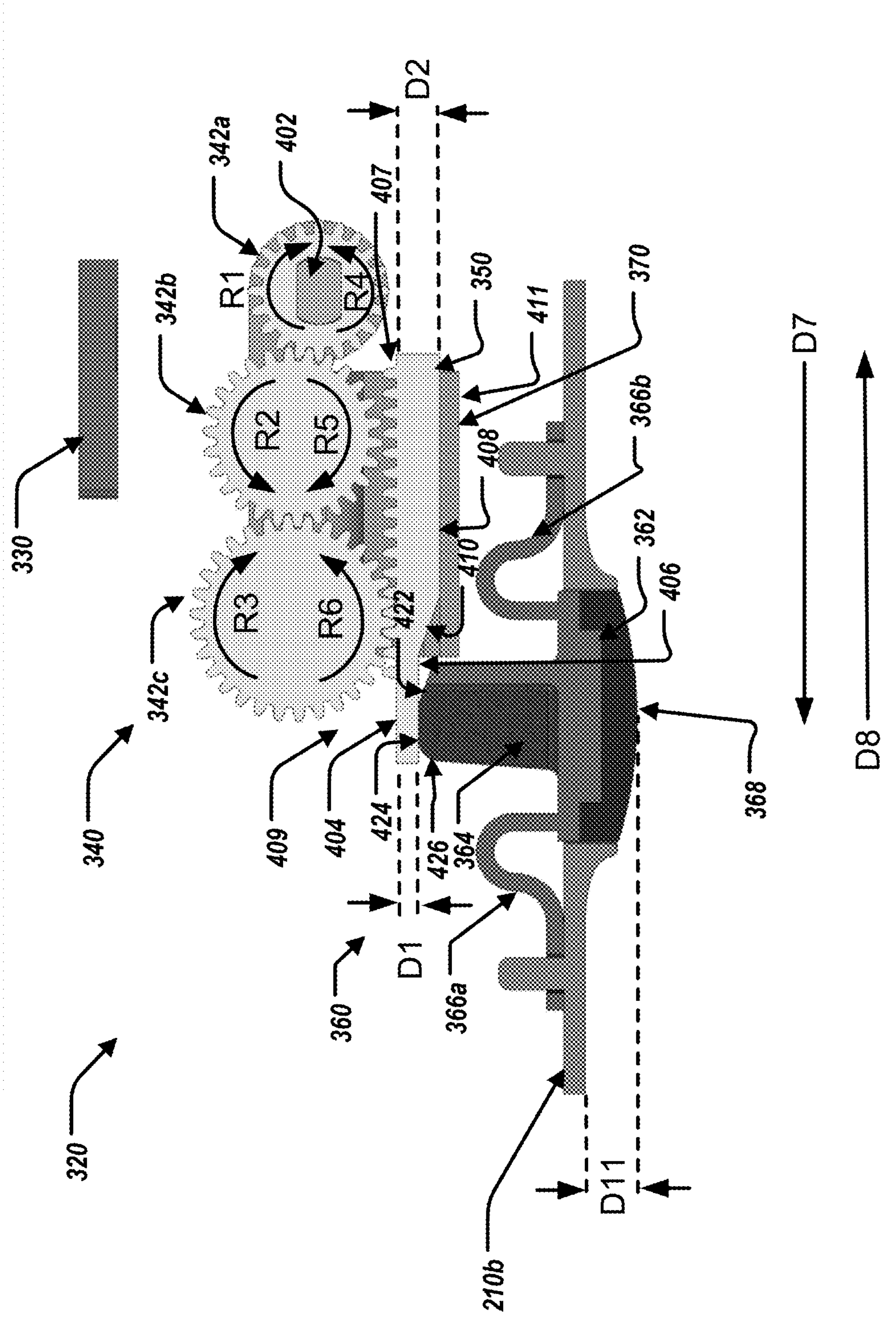
FIG. 4B illustrates a cutaway side view of the hinge apparatus, in the first positioning.

FIG. 4A illustrates a top down perspective view of the hinge apparatus 320; and FIG. 4B illustrates a cutaway side view of the hinge apparatus 320. Referring to FIGS. 4A, 4B, the hinge apparatus 320 includes the bracket 330. The bracket 330 is coupled to the first body 210*a* of the information handling system 202.

The hinge apparatus 320 further includes the gear assembly 340. The gear assembly 340 includes a first gear 342*a*, a second gear 342*b*, and a third gear 342*c* (collectively referred to as gears 342). The first gear 342*a* is rotatably coupled to the second gear 342*b*; and the second gear 342*b* is rotatably coupled to the third gear 342*c*. For example, the first gear 342*a* can rotate in a first direction R1, the second gear 342*b* can rotate in a second direction R2, and the third gear 342*c* can rotate in a third direction R3. The first direction R1 can be the same as the third direction R3; and the second direction R2 can be opposite to the first direction R1 and the third direction R3. In some examples, from the point of view of FIG. 4B, the first direction R1 and the third direction R3 are clockwise; and the second direction R2 is counterclockwise. In another example, the first gear 342*a* can rotate in a fourth direction R4, the second gear 342*b* can rotate in a fifth direction R5, and the third gear 342*c* can rotate in a sixth direction R6. The fourth direction R4 can be the same as the sixth direction R6; and the fifth direction R5 can be opposite to the fourth direction R4 and the sixth direction R6. In some examples, from the point of view of FIG. 4B, the fourth direction R4 and the sixth direction R6 are counterclockwise; and the fifth direction R5 is clockwise.

The gear assembly 340 can be coupled to the bracket 330, and in particular, the first gear 342*a* is coupled to the bracket 330 via a shaft 402. In some examples, a radius of the third gear 342*c* is greater than a radius of the second gear 342*b*, and the radius of the second gear 342*b* is greater than a radius of the first gear 342*a*.

The hinge apparatus 320 further includes the rack 350. The rack 350 can include a first side 409 and a second side 411. The second side 411 can be positioned opposite the first side 409. The first side 409 of the rack 350 can include a toothed surface 404. The toothed surface 404 can include a plurality of teeth 407 spanning a portion of the toothed surface 404, and in some examples, an entirety of the toothed surface 404. The second side 411 of the rack 350 can include a first surface 406, a second surface 408, and an angled surface 410. The first surface 406 can be spaced-apart from the toothed surface 404 a first distance D1. The second surface 408 can be spaced-apart from the toothed surface 406 a second distance D2. The second distance D2 is greater than the first distance D1. The angled surface 410 is positioned between the first surface 406 and the second surface 408. The angled surface 410 can form an angle with respect to the first surface 406 and the second surface 408. For example, the angle can be 45 degrees (e.g., at the intersection of the first surface 406 and the angled surface 410).

The rack 350 can be moveably coupled to the gear assembly 340. Specifically, the third gear 342*c* of the gear assembly 340 is rotatably coupled to the rack 350, and in particular, the third gear 342*c* is engaged with the toothed surface 404 of the rack 350. The third gear 342*c* is engaged with the toothed surface 404 of the rack 350 including teeth of the third gear 342*c* engaged with the teeth 407 of the toothed surface 404 of the rack 350.

The hinge apparatus 320 further includes the foot assembly 360. The foot assembly 360 is coupled to the second body 210*b*. The foot assembly 360 includes the base 362, the protrusions 364, the flexible arms 366*a*, 366*b*, 366*c*, 366*d* (collectively referred to as flexible arms 366), and the foot 368. The protrusions 364 and the flexible arms 366 can be coupled to the base 362. The foot 368 can be coupled to the base 362. The foot 368 can be formed from a thermoplastic elastomer, and/or rubber. The flexible arms 366 can each be coupled to the second body 210*b*. Specifically, the flexible arms 366 each can include a hole that slides over a protrusion 420 of the second body 210*b* to couple the respective flexible arm 366 to the second body 210*b*.

Herein, any aspect described with respect to the protrusion 364 can be applicable to one or both of the protrusions 364.

The protrusion 364 can extend from the base 362. The protrusion 364 can include a sloped surface 422; a flat surface 424, and a curved surface 426. The flat surface 424 can be positioned between the sloped surface 422 and the curved surface 426. The sloped surface 422 can form an angle with respect to the flat surface 424. For example, the angle can be 45 degrees (e.g., at the intersection of the sloped surface 422 and the flat surface 424).

In some examples, the sloped surface 422 of the protrusion 364 is complimentary to the angled surface 410 of the rack 350 (the angled surface 410 of the rack 350 is complimentary to the sloped surface 422 of the protrusion 364); that is, the angle of the sloped surface 422 and the angle of the angled surface 410 are substantially the same, or similar.

The hinge apparatus 320 further includes the holding bracket 370. The holding bracket 370 can include a slot 430. The rack 350 can be positioned within the slot 430 of the holding bracket 370. Specifically, the rack 350 can be positioned within the slot 430 such that the rack 350 is slidably coupled to the holding bracket along the directions D7 and D8.

Furthermore, the gear assembly 340 is coupled to the holding bracket 370. For example, the gears 342 can include posts that are coupled to holes of the gear assembly 340.

To that end, the first body 210*a* of the information handling system 202 is rotatable with respect to the second body 210*b* of the information handling system 202 to rotate the first gear 342*a* via the bracket 330. Specifically, as the second body 210*b* rotates with respect to the first body 210*a* (e.g. a user "opening" the information handling system 202 from a closed position), the second body 210*b* rotates the bracket 370 about the first gear 342*a* as the bracket 370 is coupled to the second body 210*b* and the first gear 342*a* via the shaft 402.

Further, the first gear 342*a* is rotatable about the shaft 402 to translate the rack 350 along the direction D7. Specifically, as the first gear 342*a* rotates in the direction R1 (as a result of being coupled to the bracket 330), the first gear 342*a* rotates the second gear 342*b* along the direction R2. Furthermore, as the second gear 342*b* rotates along the direction R2, the second gear 342*b* rotates the third gear 342*c* along the direction R3. To that end, as the third gear 342*c* is engaged with the toothed surface 404 of the rack 350 (including teeth of the third gear 342*c* engaged with the teeth 407 of the toothed surface 404 of the rack 350), the third gear 342*c* rotates to translate the rack 350 along the direction D7.

In a first example, when the second body 210*b* rotates with respect to the first body 210*a* (e.g., a user "opening" the information handling system 202 from a closed position), the first gear 342*a* rotates along the direction R1, which in turn rotates the second gear 342*b* along the second direction D2, which in turn rotates the third gear 342*c* along the direction R3, which in turn translates the rack 350 along the direction D7. In a second example, when the second body 210*b* rotates with respect to the first body 210*a* (e.g., a user "closing" the information handling system 202 from an open position), the first gear 342*a* rotates along the direction R4, which in turn rotates the second gear 342*b* along the direction D5, which in turn rotates the third gear 342*c* along the direction R6, which in turn translates the rack 350 along the direction D8, with the direction D8 being opposite to the direction D7.

To that end, FIGS. 4A and 4B illustrate the rack 350 in an initial position. That is, the second body 210*b* of the information handling system 202 is at a zero-degree angle with respect to the first body 210*a* of the information handling system (the information handling system 202 is in a closed position). When the rack 350 is in the initial position, the first surface 406 of the rack 350 is in contact with the flat surface 424 of the protrusion 364 of the foot assembly 360.

Furthermore, when the rack 350 is in the initial position, the flexible arms 366 maintain an initial position of the foot assembly 360. That is, when the first surface 406 of the rack 350 is in contact with the flat surface 424 of the protraction 364 of the foot assembly 360, the flexible arms 366 apply a force to the base 362 and the foot 368 to maintain a desired positioning (initial positioning) of the base 362/foot 368 with respect to the second body 210*b* of the information handling system 202.

As shown, the initial position of the foot assembly 360 can include the foot 368 being spaced-apart from the second body 210*b* of the information handling system 202 an eleventh distance D11.

Figure 5A:
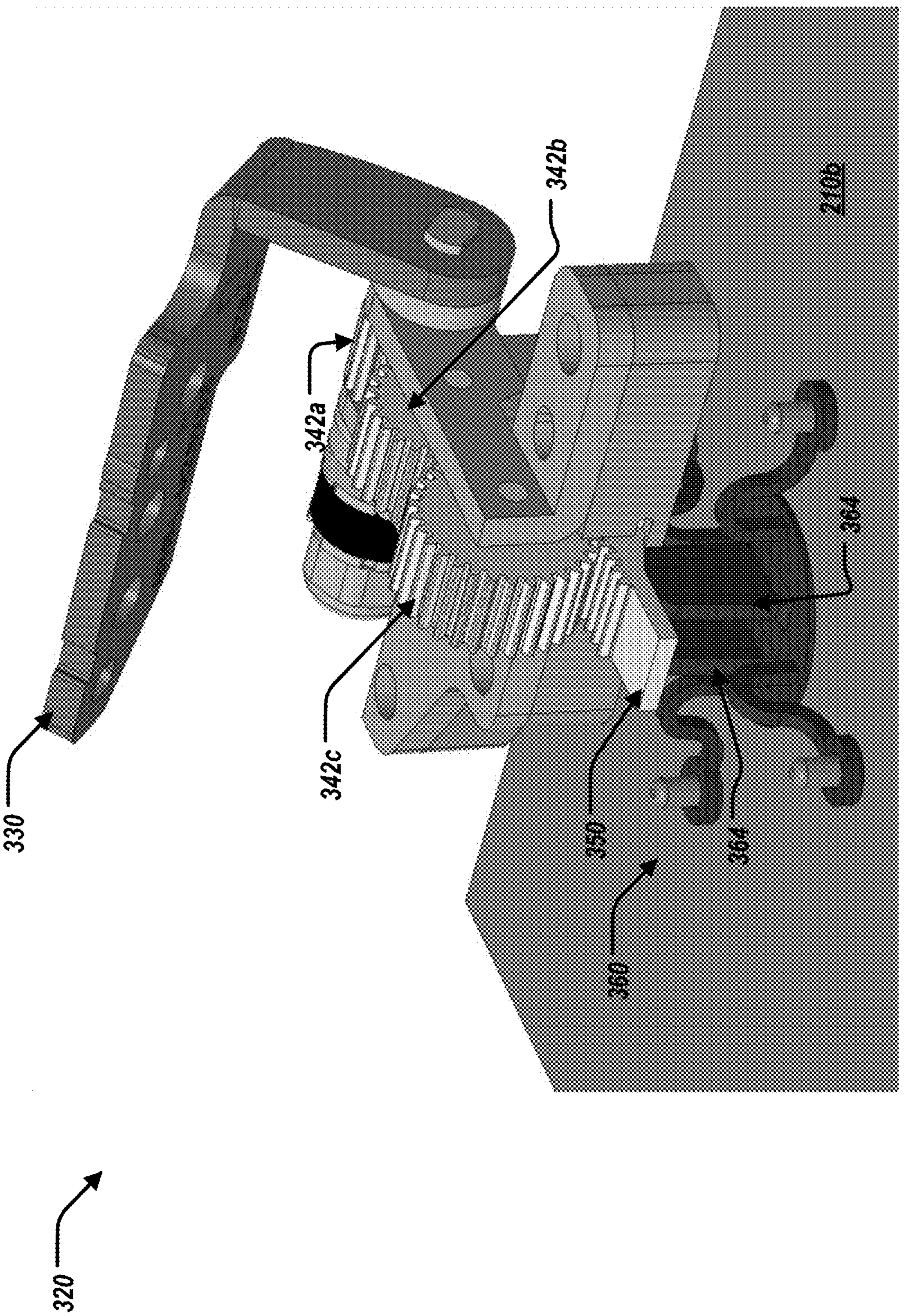
FIG. 5A illustrates a perspective view of the hinge apparatus, in a second positioning.
Figure 5B:
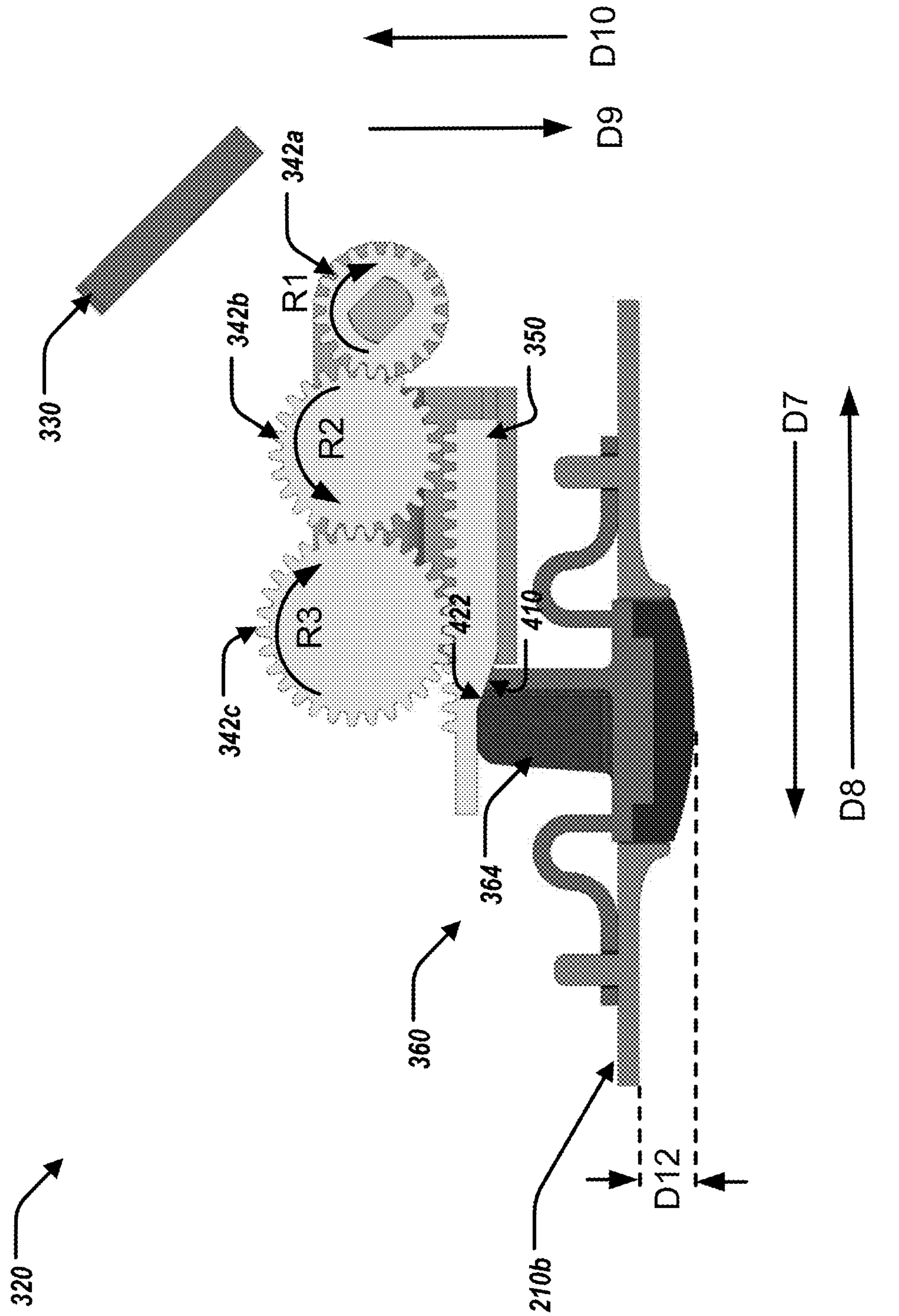
FIG. 5B illustrates a perspective view of the hinge apparatus, in the second positioning.

FIGS. 5A, 5B illustrate the hinge apparatus 320 in a further state. Specifically, when the second body 210*b* rotates with respect to the first body 210*a* (e.g., a user "opening" the information handling system 202 from a closed position), the first gear 342*a* rotates along the direction R1, which in turn rotates the second gear 342*b* along the second direction D2, which in turn rotates the third gear 342*c* along the direction R3, which in turn translates the rack 350 along the direction D7. When the rack 350 translates along the direction D7, the angled surface 410 of the rack 350 contacts the sloped surface 422 of the protrusion 364 of the foot assembly 360. As shown, the bracket 330 is at a positioning indicating a 45-degree angle between the second body 210*b* and the first body 210*a*.

As the rack 350 further translates along the direction D7 (as a result of further rotation of the second body 210*b* with respect to the first body 210*a*), the angled surface 410 of the rack 350 continues to "slide" along the sloped surface 422 of the protrusion 364. As the angled surface of the rack 350 "slides" along the sloped surface 422 of the protrusion 364 during the translation of the rack 350 along the direction D7, the foot assembly 360 translates along a ninth direction D9 that is orthogonal to the seventh direction D7. That is, the foot assembly 360 translates along the ninth direction D9 from an initial position to a second position. Specifically, the base 362 and the foot 368 translate along the direction D9 from the initial position with respect to the second body 210*b* of the information handling system 202 to the second position with respect to the second body 210*b*.

Furthermore, when the rack 350 is in the second position, the flexible arms 366 flex to transition the foot assembly 360 to the second position. That is, when the angled surface 410 of the rack 350 is in contact with the sloped surface 422 of the protrusion 364 of the foot assembly 360, the flexible arms 366 apply a force to the base 362 and the foot 368 ("flex") to transition the foot assembly 360 from the initial position to the second position of the base 362/foot 368 with respect to the second body 210*b* of the information handling system 202.

As shown, the second position of the foot assembly 360 can include the foot 368 being spaced-apart from the second body 210*b* of the information handling system 202 a twelfth distance D12. The twelfth distance D12 is greater than the eleventh distance D11.

Figure 6A:
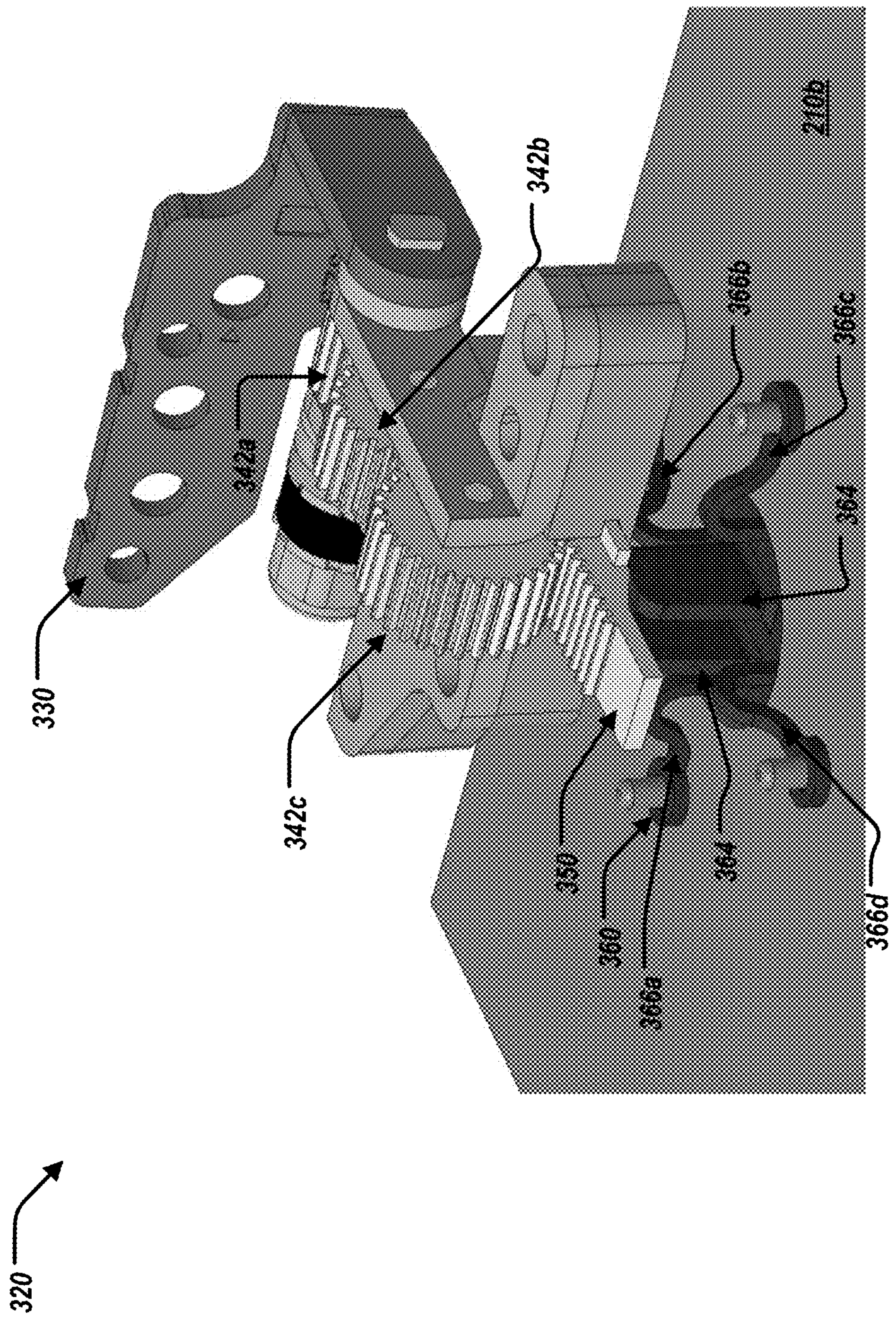
FIG. 6A illustrates a perspective view of the hinge apparatus, in a third positioning.
Figure 6B:
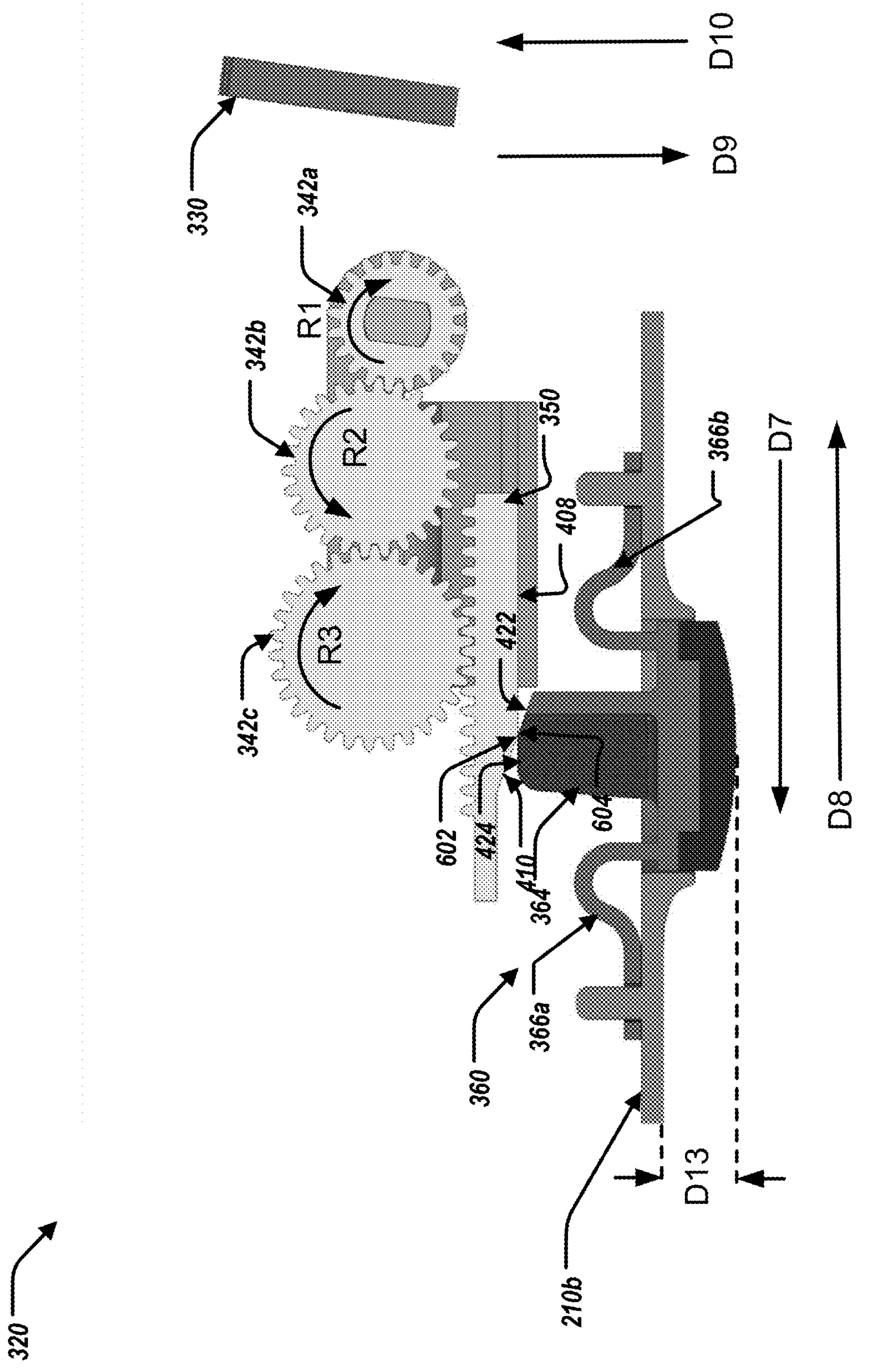
FIG. 6B illustrates a perspective view of the hinge apparatus, in the third positioning.

FIGS. 6A, 6B illustrate the hinge apparatus 320 in a further state. Specifically, when the second body 210*b* further rotates with respect to the first body 210*a* (e.g., the user further "opening" the information handling system 202 from a closed position), the first gear 342*a* further rotates along the direction R1, which in turn further rotates the second gear 342*b* along the second direction D2, which in turn further rotates the third gear 342*c* along the direction R3, which in turn further translates the rack 350 along the direction D7. When the rack 350 further translates along the direction D7, the angled surface 410 of the rack 350 further "slides" against the sloped surface 422 of the protrusion 364 of the foot assembly 360 until an apex 602 of the angled surface 410 meets an apex 604 of the sloped surface 422 such that the second surface 408 of the rack 350 contacts the flat surface 424 of the protrusion 364 of the foot assembly 360 to transition the rack 350 from the second position to a final position. As shown, the bracket 330 is at a positioning indicating a 98-degree angle between the second body 210*b* and the first body 210*a*.

As the rack 350 further translates along the direction D7 (as a result of further rotation of the second body 210*b* with respect to the first body 210*a*), the foot assembly 360 further translates along the ninth direction D9 that is orthogonal to the seventh direction D7. That is, the foot assembly 360 translates along the ninth direction D9 from the second position to a final position. Specifically, the base 362 and the foot 368 translate along the direction D9 from the second position with respect to the second body 210*b* of the information handling system 202 to the final position with respect to the second body 210*b*.

Furthermore, when the rack 350 is in the final position, the flexible arms 366 flex to transition the foot assembly 360 to the final position. That is, when the second surface 408 of the rack 350 is in contact with the flat surface 424 of the protrusion 364 of the foot assembly 360, the flexible arms 366 apply a force to the base 362 and the foot 368 ("flex") to transition the foot assembly 360 from the second position to the final position of the base 362/foot 368 with respect to the second body 210*b* of the information handling system 202.

As shown, the second position of the foot assembly 360 can include the foot 368 being spaced-apart from the second body 210*b* of the information handling system 202 a thirteenth distance D13. The thirteenth distance D13 is greater than the twelfth distance D12.

Figure 7A:
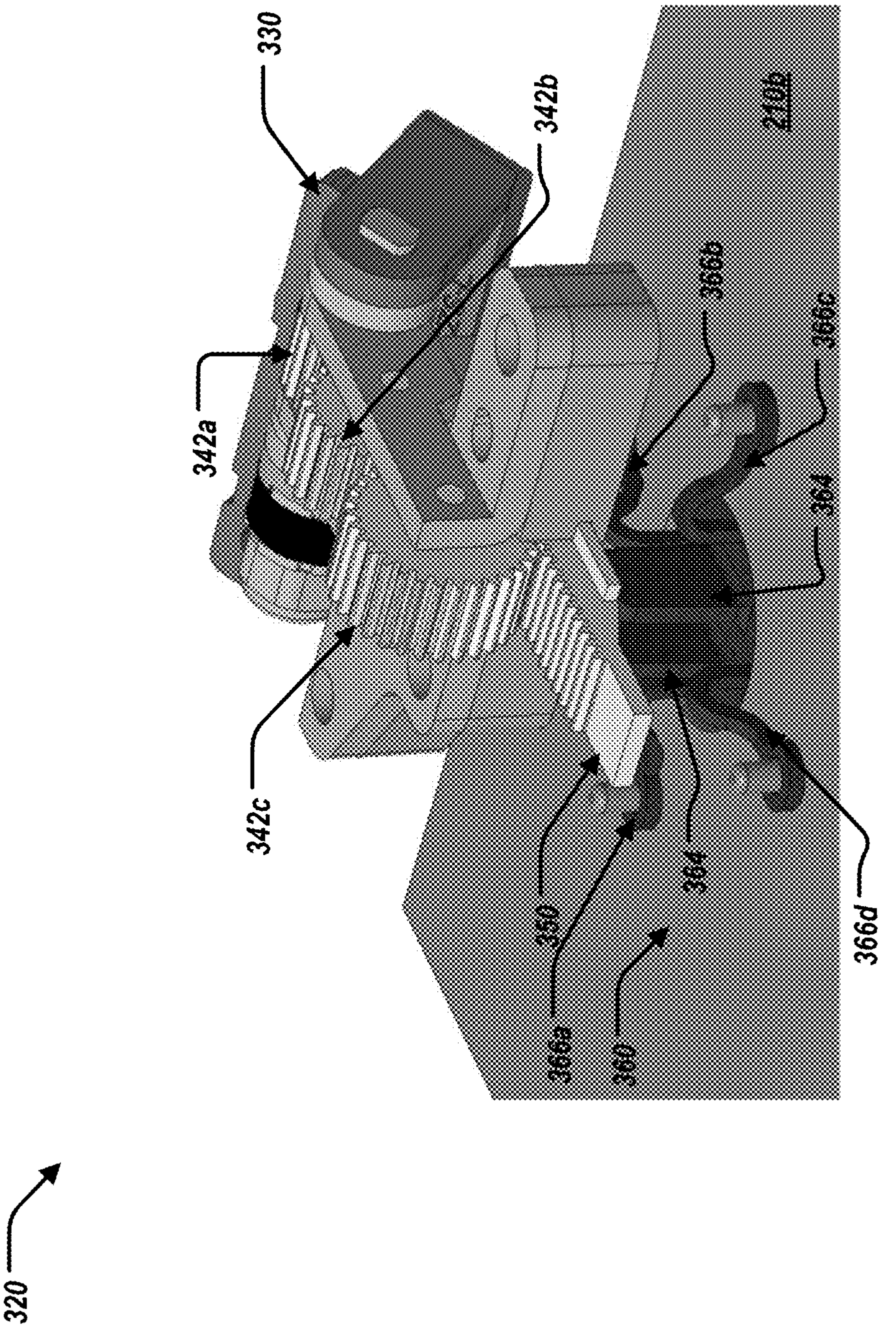
FIG. 7A illustrates a perspective view of the hinge apparatus, in a fourth positioning.
Figure 7B:
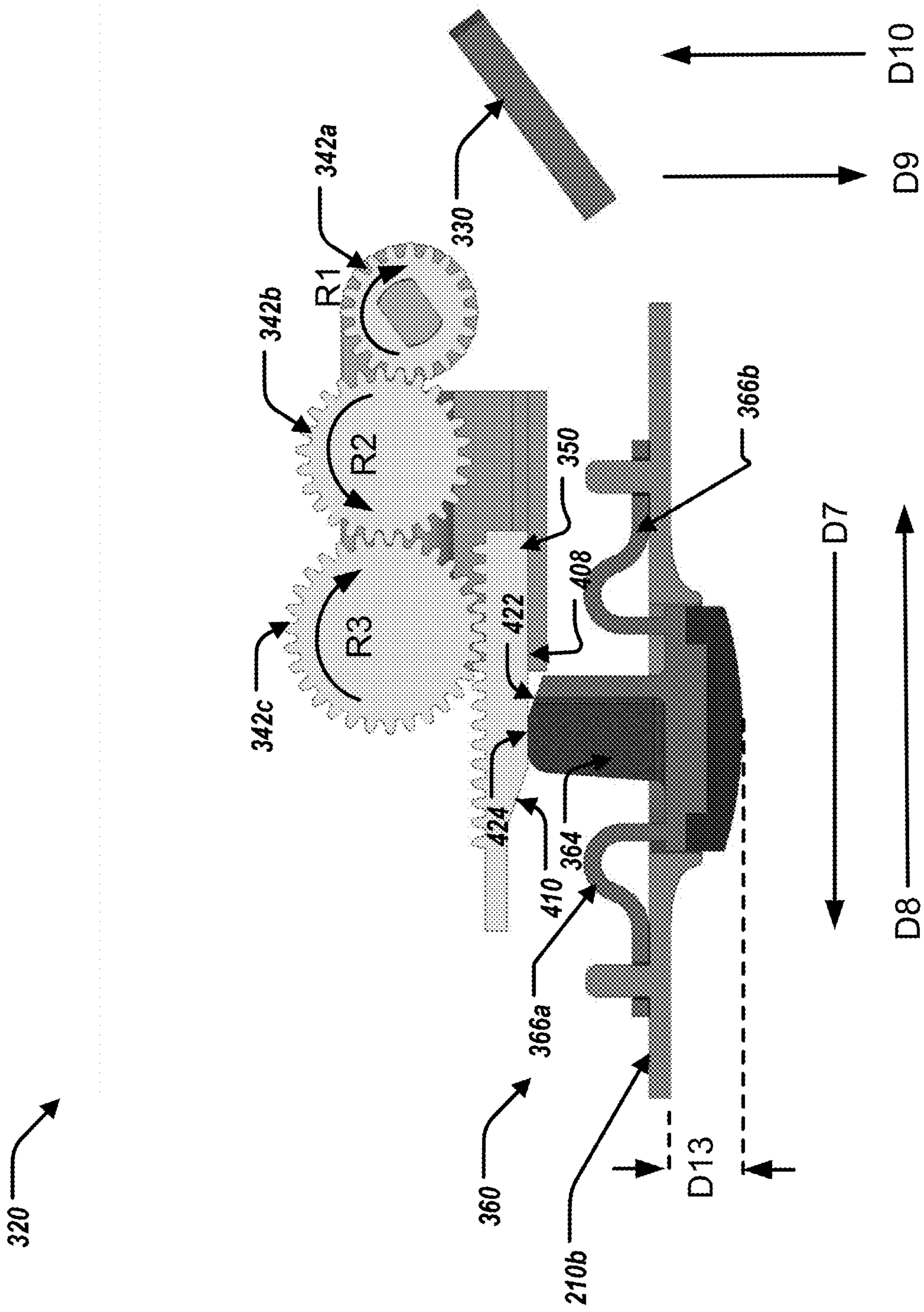
FIG. 7B illustrates a perspective view of the hinge apparatus, in the fourth positioning.

FIGS. 7A, 7B illustrate the hinge apparatus 320 in a further state. Specifically, when the second body 210*b* further rotates with respect to the first body 210*a* (e.g., the user further "opening" the information handling system 202 from a closed position), the first gear 342*a* further rotates along the direction R1, which in turn further rotates the second gear 342*b* along the second direction D2, which in turn further rotates the third gear 342*c* along the direction R3, which in turn further translates the rack 350 along the direction D7. When the rack 350 further translates along the direction D7, the second surface 408 of the rack 350 further contacts the flat surface 424 of the protrusion 364 of the foot assembly 360 to maintain the final position of the rack 350.

As shown, the bracket 330 is at a positioning indicating a 145-degree angle between the second body 210*b* and the first body 210*a*.

As the rack 350 further translates along the direction D7 (as a result of further rotation of the second body 210*b* with respect to the first body 210*a*), the positioning of the foot assembly 360 is maintained. Specifically, the base 362 and the foot 368 maintain the final position with respect to the second body 210*b*.

Furthermore, when the rack 350 is in the final position, the flexible arms 366 maintain the final position of the foot assembly 360. That is, when the second surface 408 of the rack 350 is in contact with the flat surface 424 of the protrusion 364 of the foot assembly 360, the flexible arms 366 apply a force to the base 362 and the foot 368 to maintain the foot assembly 360 in the final position of the base 362/foot 368 with respect to the second body 210*b* of the information handling system 202.

As shown, the second position of the foot assembly 360 can include the foot 368 being spaced-apart from the second body 210*b* of the information handling system 202 the thirteenth distance D13.

Referring back to FIGS. 4A, 4B, in a further implementation, the second body 210*b* rotates with respect to the first body 210*a* in the opposite direction (e.g., a user "closing" the information handling system 202 from an open position), the first gear 342*a* rotates along the direction R4, which in turn rotates the second gear 342*b* along the second direction D5, which in turn rotates the third gear 342*c* along the direction R6, which in turn translates the rack 350 along the direction D8. When the rack 350 translates along the direction D8 (from the final position shown in FIGS. 7A, 7B), the second surface 408 of the rack 350 goes from contacting the flat surface 424 of the protrusion 364 of the foot assembly 360 (as shown in FIGS. 7A, 7B), to the angled surface 410 of the rack 350 contacting the sloped surface 422 of the protrusion 364 of the foot assembly 360 (as shown in FIGS. 5A, 5B), to the first surface 406 of the rack 350 contacting the flat surface 424 of the protrusions 364 of the foot assembly 360 (as shown in FIGS. 4A, 4B).

As the rack 350 further translates along the direction D8 (as a result of the rotation of the second body 210*b* with respect to the first body 210*a*), the foot assembly 360 translates along a tenth direction D10 that is opposite to the ninth direction D9 from the final position ultimately to the initial position. Specifically, the base 362 and the foot 368 translate along the direction D9 from the final position with respect to the second body 210*b* of the information handling system 202 to the initial position with respect to the second body 210*b*, as shown in FIG. 4B.

In some examples, the angle of the sloped surface 422 of the protrusion 364 of the foot assembly 360 and the angle of the angled surface 410 of the rack 350 can be any angle to obtain a desired difference in height between the eleventh distance D11 and the thirteenth distance D13. In some examples, the difference between the eleventh distance D11 and the thirteenth distance D13 is 1 millimeter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A hinge apparatus for a dual-body information handling system, including:

- a bracket coupled to a first body of the dual-body information handling system;
- a gear assembly including at least a first gear, the gear assembly coupled to the bracket via a shaft;
- a rack moveably coupled to the gear assembly, the rack including;
  - a first side, including a toothed surface that is engaged with the gearing assembly;
  - a second side positioned opposite to the first side, the second side including:
    - a first surface at the first end and spaced-apart from the toothed surface a first distance,
    - a second surface at the second end and spaced-apart from the toothed surface a second distance greater than the first distance, and
    - a single angled surface connecting the first surface and the second surface;
- a foot assembly coupled to a second body of the dual-body information handling system, including:
  - a base; and
  - a protrusion extending from the base, the protrusion including a sloped surface;
- wherein the first body is rotatable with respect to the second body to rotate the first gear via the bracket,
- wherein the first gear is rotatable to translate the rack along a first direction,
- wherein the rack is translatable along the first direction such that the angled surface of the rack contacts the sloped surface of the protrusion of the foot assembly to translate the foot assembly in a second direction from an initial position to a second position, the second direction orthogonal to the first direction, and
- wherein the rack is translatable along the first direction such that the second surface of the rack contacts the flat surface of the foot assembly to transition the rack from the second position to a final position in the second direction, and the second surface maintains the final position of the rack in the second direction during further translation of the rack along the first direction.

2. The hinge apparatus of claim 1, wherein the protrusion of the foot assembly further includes a flat surface, and wherein when the rack is in the initial position, the first surface of the rack is in contact with the flat surface of the foot assembly.

3. The hinge apparatus of claim 2, wherein the single angled surface of the rack is complimentary to the sloped surface of the protrusion of the foot assembly.

4. The hinge apparatus of claim 2, the foot assembly further including:

a plurality of flexible arms each coupled to the second body of the dual-body information handling system, wherein the flexible arms maintain the initial position of the foot assembly when the first surface of the rack is in contact with the flat surface of the protrusion of the foot assembly.

5. The hinge apparatus of claim 4, wherein the flexible arms flex to transition the foot assembly from the initial position to the second position when the angled surface of the rack contacts the sloped surface of the protrusion of the foot assembly.

6. The hinge apparatus of claim 5, wherein the flexible arms further flex to transition the foot assembly from the second position to the final position when the second surface of the rack contacts the flat surface of the protrusion of the foot assembly.

7. The hinge apparatus of claim 1, wherein the gear assembly includes the first gear, a second gear, and a third gear, wherein the first gear is rotatably coupled to the second gear and the second gear is rotatably coupled to the third gear, and wherein the third gear is rotatably coupled to the rack.

8. The hinge apparatus of claim 1, further including:

a holding bracket including a slot, wherein at least a portion of the rack is positioned within the slot of the holding bracket such that the rack is slidably coupled to the holding bracket.

9. The hinge apparatus of claim 8, wherein the gear assembly is coupled to the holding bracket.

10. A dual-body information handling system, comprising:

a processor;

memory media storing instructions executable by the processor to perform operations;

a hinge apparatus, comprising:

a bracket coupled to a first body of the dual-body information handling system;

a gear assembly including at least a first gear, the gear assembly coupled to the bracket via a shaft;

a rack moveably coupled to the gear assembly, the rack including:

a first side, including a toothed surface that is engaged with the gearing assembly;

a second side positioned opposite to the first side, the second side including:

a first surface at the first end and spaced-apart from the toothed surface a first distance, a second surface at the second end and spaced-apart from the toothed surface a second distance greater than the first distance, and a single angled surface connecting the first surface and the second surface;

a foot assembly coupled to a second body of the dual-body information handling system, including:

a base; and a protrusion extending from the base, the protrusion including a sloped surface;

wherein the first body is rotatable with respect to the second body to rotate the first gear via the bracket, wherein the first gear is rotatable to translate the rack along a first direction, wherein the rack is translatable along the first direction such that the angled surface of the rack contacts the sloped surface of the protrusion of the foot assembly to translate the foot assembly in a second direction from an initial position to a second position, the second direction orthogonal to the first direction, and wherein the rack is translatable along the first direction such that the second surface of the rack contacts the flat surface of the foot assembly to transition the rack from the second position to a final position in the second direction, and the second surface maintains the final position of the rack in the second direction during further translation of the rack along the first direction.

11. The dual-body information handling system of claim 10, wherein the protrusion of the foot assembly further includes a flat surface, and wherein when the rack is in the initial position, the first surface of the rack is in contact with the flat surface of the foot assembly.

12. The dual-body information handling system of claim 11, wherein the single angled surface of the rack is complimentary to the sloped surface of the protrusion of the foot assembly.

13. The dual-body information handling system of claim 11, the foot assembly further including:

a plurality of flexible arms each coupled to the second body of the dual-body information handling system, wherein the flexible arms maintain the initial position of the foot assembly when the first surface of the rack is in contact with the flat surface of the protrusion of the foot assembly.

14. The dual-body information handling system of claim 13, wherein the flexible arms flex to transition the foot assembly from the initial position to the second position when the angled surface of the rack contacts the sloped surface of the protrusion of the foot assembly.

15. The dual-body information handling system of claim 14, wherein the flexible arms further flex to transition the foot assembly from the second position to the final position when the second surface of the rack contacts the flat surface of the protrusion of the foot assembly.

16. The dual-body information handling system of claim 10, wherein the gear assembly includes the first gear, a second gear, and a third gear, wherein the first gear is rotatably coupled to the second gear and the second gear is rotatably coupled to the third gear, and wherein the third gear is rotatably coupled to the rack.

* * * * *